United States Patent [19]
Nachlas et al.

[11] Patent Number: 5,479,700
[45] Date of Patent: Jan. 2, 1996

[54] DESIGN AND MANUFACTURING METHOD FOR A SOLID ELECTROLYTE ION CONDUCTING DEVICE

[75] Inventors: Jesse A. Nachlas, Eden; Kelly B. Powers, North Salt Lake, both of Utah; James R. McJunkin, Afton, Wyo.

[73] Assignee: Ceramatec, Inc., Salt Lake City, Utah

[21] Appl. No.: 219,205

[22] Filed: Mar. 29, 1994

Related U.S. Application Data

[62] Division of Ser. No. 843,004, Feb. 28, 1992, Pat. No. 5,298,138.

[51] Int. Cl.⁶ .................................................. H01R 43/00
[52] U.S. Cl. ............................ 29/825; 204/267; 204/269
[58] Field of Search ................................. 29/825; 264/61; 429/33, 32; 204/267, 269

[56] References Cited

U.S. PATENT DOCUMENTS

| | | |
|---|---|---|
| 3,692,585 | 9/1972 | Maye . |
| 4,428,110 | 1/1984 | Kim . |
| 4,462,891 | 7/1984 | Lawless ................................ 429/33 X |
| 4,664,987 | 5/1987 | Isenberg . |
| 4,725,346 | 2/1988 | Joshi . |
| 4,797,194 | 1/1989 | Mase et al. ............................ 264/61 X |
| 4,798,693 | 1/1989 | Mase et al. ............................ 264/61 X |
| 4,877,506 | 10/1989 | Fee et al. . |
| 4,879,016 | 11/1989 | Joshi . |
| 4,950,562 | 8/1990 | Yoshida et al. . |
| 5,021,137 | 6/1991 | Joshi et al. . |
| 5,034,288 | 7/1991 | Bossel . |
| 5,049,459 | 9/1991 | Akagi . |
| 5,063,122 | 11/1991 | Rohr ........................................ 429/32 |
| 5,069,987 | 12/1991 | Gordon . |
| 5,195,019 | 3/1993 | Hertz . |
| 5,286,322 | 2/1994 | Armstrong et al. .................. 264/61 X |
| 5,336,274 | 8/1994 | Meyer et al. . |

*Primary Examiner*—Carl J. Arbes
*Attorney, Agent, or Firm*—Trask, Britt & Rossa

[57] ABSTRACT

An ion conducting device having a plurality of solid electrolyte plates arranged into a stack, each electrolyte plate having electrode material adherent to a significant portion thereof. A plurality of individual spacers are disposed between adjacent electrolyte plates in the stack, each spacer spacing successive electrolyte plates apart, and defining a plurality of chambers in the spaces between adjacent electrolyte plates. The electrode material on the electrolyte plates is electrically connected whereby electrode material on every other successive plate is connected in series, from one end of the stack to the other, whereupon the electrical path wraps around the stack and extends back along the stack and connects in series the electrodes not previously connected.

6 Claims, 3 Drawing Sheets

DESIGN AND MANUFACTURING METHOD FOR A SOLID ELECTROLYTE ION CONDUCTING DEVICE

This is a divisional application of prior U.S. Application Ser. No. 07/843,004, filed Feb. 28, 1992, which has now issued as U.S. Pat. No. 5,298,138 on Mar. 29, 1994.

BACKGROUND OF THE INVENTION

1. Field

The present invention generally relates to ion conducting devices, and more particularly to current based ion conducting devices arranged into a stack of electrically interconnected solid electrolyte plates.

2. State of the Art

Ion conducting devices based on solid electrolytes are typically constructed according to two basic designs. Passive ion conducting devices detect the electromotive force potential across the solid electrolyte due to the Nernst voltage generated when different ion concentrations exist on opposite sides of a membrane. Passive devices are used in a variety of applications including automotive sensors and process gas analyzers. Current based ion conducting devices depend on the transport of ions through the electrolyte due to either a pressure differential across the electrolyte, or from an applied electromotive force. Current based devices are more complex in construction and operation, but have a wider range of applications. Well known applications for current based devices include fuel cells, inert gas purifiers, oxygen concentrators, and steam electrolyzers.

An electrode material is attached to the electrolyte surfaces, the composition of which depends on the intended application and operating conditions. Reactant gases contacting the electrode undergo a reaction whereby an ion species is generated which migrates through the electrolyte. For example, in an oxygen concentrator the ion species is $O^{-2}$, and is formed according to the following reaction:

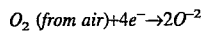
$$O_2 \text{ (from air)} + 4e^- \rightarrow 2O^{-2}$$

The $O^{-2}$ migrates through the electrolyte due to an applied electromotive force. Pure oxygen may be collected on the opposite side of the electrolyte according to the following reaction:

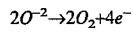
$$2O^{-2} \rightarrow 2O_2 + 4e^-$$

In a fuel cell, an electrical potential is produced between a cathode and anode in contact with different concentrations of ions. When the electrodes are connected in an electrical circuit, the electrons released at the anode furnish an electrical current.

Several U.S. patents teach solid oxide electrolytes arranged in various structural configurations. U.S. Pat. No. 4,664,987 (Isenberg) teaches a fuel cell arrangement utilizing a tubular configuration for the solid oxide electrolyte. U.S. Pat. No. 4,950,562 (Yoshida et al.) teaches a flat plate solid oxide electrolyte configuration. Several U.S. Patents teach fuel cell assemblies comprising a stack of solid oxide electrolyte elements. Notable among these patents are U.S. Pat. Nos. 5,069,987; 5,049,459; 5,034,288; and 4,950,562. In each of these arrangements, successive electrolyte elements are separated from the elements above and below it by an inert interconnector plate, or separator. The interconnector plates prevent reactants and products from mixing, yet permit the reactants to come in contact with the electrode surfaces. U.S. Pat. No. 4,877,506 (Fee et al.) teaches an oxygen pump employing a stack of solid oxide electrolyte elements, and utilizing inert interconnector plates between successive elements.

The interconnectors in these current based devices are part of an electrical circuit, and must be either constructed from an electrically conductive material, or include an electrical pathway through the interconnector. Electrically conductive materials suitable for incorporation into a flat plate ion conducting device are less expensive than the electrolyte material. The interconnectors may be constructed from the expensive electrolyte material, in which case the electrical pathway is either incorporated into the interconnector, or attached to the exterior. If the solid electrolyte is used, extremely expensive material is used for inert plates comprising approximately 50% of the stack. If an electrically conductive material is used, dissimilar materials are incorporated into the stack.

Several problems inherent in these stacked arrangements make them unreliable, inefficient, and expensive. A typical operating temperature range for solid oxide ion conducting devices is 800°–1000° C. Substantial thermal expansion of materials occurs when materials are heated to these high temperatures. The different rate and extent of thermal expansion between dissimilar materials can cause cracks and distortions in the stack. Leaks may develop between the electrolyte and interconnectors, allowing reactant gases to escape before contacting the electrode. Product gases may also escape through cracks in seams or materials. These factors severely reduce the efficiency and reliability of the device. If delamination between stack components is severe enough, total failure of the device may result. Another disadvantage of using dissimilar materials is the difficulty in maintaining an intact electrical interconnect system. Problems with contact resistance frequently result when the interconnects are bonded to different materials. The different coefficients of thermal expansion tend to crack and destroy the conductive material. These problems are obviously undesirable in space applications, where the device must remain reliable for an extended period of time, while exposed to extreme thermal and vibration stresses.

Interconnectors also significantly reduce the efficiency of a stack of electrolyte elements. Because the plates are inert, approximately 50% of the components of the stack are inactive. The interconnectors also must seal against the electrolyte plates. Wherever the interconnector contacts the electrode, gas transport through the electrode to the electrolyte surface tends to be limited. The reactive electrolyte area available for ion conduction is thus potentially reduced through the use of inert interconnectors.

Interconnectors made from electrolyte material contribute significantly to the cost of an ion conducting device. The material itself is very expensive, and approximately one interconnector is required for every active electrolyte plate. Complex manufacturing methods are also required to produce an interconnector with a typical dual ribbed structure. These factors make manufacture of ion conducting devices with interconnectors more difficult and complicated, which increases both cost and manufacturing time.

There is a need for an improved solid oxide electrolyte ion conducting device which overcomes the aforementioned problems.

SUMMARY OF THE INVENTION

The ion conducting device and manufacturing method of the present application are useful for a variety of current based devices including fuel cells, oxygen concentrators, inert gas purifiers, and steam electrolyzers.

The invention provides an improved, yet simplified design and manufacturing method for a flat plate ion conducting device. The design and method obviate many of the disadvantages inherent in existing designs. The design provides an arrangement which is lighter and more compact, yet provides increased ion conducting capacity. Spacer elements are used in place of interconnectors, and are manufactured from the same material as the electrolyte plates. The expensive electrolyte material may be used because the spacers are much smaller than an interconnector. The weight of the device is also reduced as a consequence of these improvements. Because all structural components of the device are constructed from the same material, cracks and distortions from thermal expansion of dissimilar materials are substantially eliminated.

The improved design utilizes a flat plate configuration for solid ion conducting electrolyte elements. Each element has a gas permeable electrode material attached to at least one surface. Typical electrolyte/electrode systems for use in the invention of the present application are disclosed in U.S. Pat. Nos. 4,725,346, 4,879,016, and 5,021,137, the contents of which are herein incorporated by reference. The type of electrode material may depend on the intended application and operating conditions. According to the manufacturing method, electrode material may be screenprinted onto the electrolyte plates in the desired pattern. Similarly, other electrically conductive materials, such as electrical interconnections between the electrolyte plates and current collector grids, may be screenprinted onto the electrolyte plate as required.

Electrolyte plates are stacked in an arrangement whereby each plate is separated from successive plates by ceramic spacers. In a preferred arrangement, each plate in the stack has two adjacent square corners and two adjacent chamfered corners. All corners of the spacers are chamfered. An electrically conductive material is applied to the surface of the plates as two stripes connecting the electrode material to the edge of the square corners. Two-piece spacers allowing through-flow of reactant gases over the electrodes may be employed on the reactant gas side of the electrode. A one piece spacer may be used on the opposite side of the electrolyte plate to channel the products into a manifold for collection.

In a preferred arrangement, electrically conductive material is applied to the chamfered corners of the plates and spacers in a specified pattern. The conductive material pattern, when combined with a specified stacking pattern, facilitates a specified manner of electrical interconnection of the plates in electrical series.

Electrolyte elements are arranged into a stack whereby every other plate is arranged 180° from the plate on either side of it. Electrode material on every other successive element, from one end of the stack to the other, may then be electrically connected in series by painting an electrically conductive material onto the chamfered corners of the plates. The electrical circuit is connected through the bottom plate in the stack, and then proceeds back up the stack in the opposite direction, connecting the electrodes bypassed previously. Several advantages result from this electrical interconnection scheme. Every plate in the stack is an active ion conducting element. This aspect of the invention reduces the number of plates for a given level of output, resulting in increased efficiency of the device. Redundant electrical connection paths on more than one corner of the plates decreases the likelihood of electrical circuit failure. Electrical resistance in the circuits between the electrolyte elements is also significantly reduced because the electrical paths are shorter and more efficient. Adjoining elements either receive reactant gases from a common reactant gas chamber, or dispense product gases into a common receiving chamber. This aspect of the invention enables electrical interconnection of the plates to be accomplished by painting an electrically conductive material onto the edges of the stack. Since the volume necessary for a given level of output by a given number of plates is significantly reduced, a stack of such plates configured and structured in accordance with the instant invention reaches its operating temperature faster, and is more easily maintained at this temperature. This further contributes to the efficiency of the device.

All structural components of the ion conducting device are constructed from the same ceramic material. When assembled and bonded into a stack, all structural materials have the same coefficient of thermal expansion. Cracks and distortions due to differing coefficients of thermal expansion are essentially eliminated.

The manufacturing method utilizes existing ceramic techniques allowing for inexpensive and rapid construction. Bonding the electrolyte elements into a stack and application of electrodes and electrically conductive materials may be accomplished using well developed large scale manufacturing techniques. The method is thus suitable for large scale manufacture with existing technologies. The design and manufacturing method result in an ion conducting device which is efficient, reliable, and cost competitive.

DETAILED DESCRIPTION OF THE ILLUSTRATED EMBODIMENT

Figure 1:
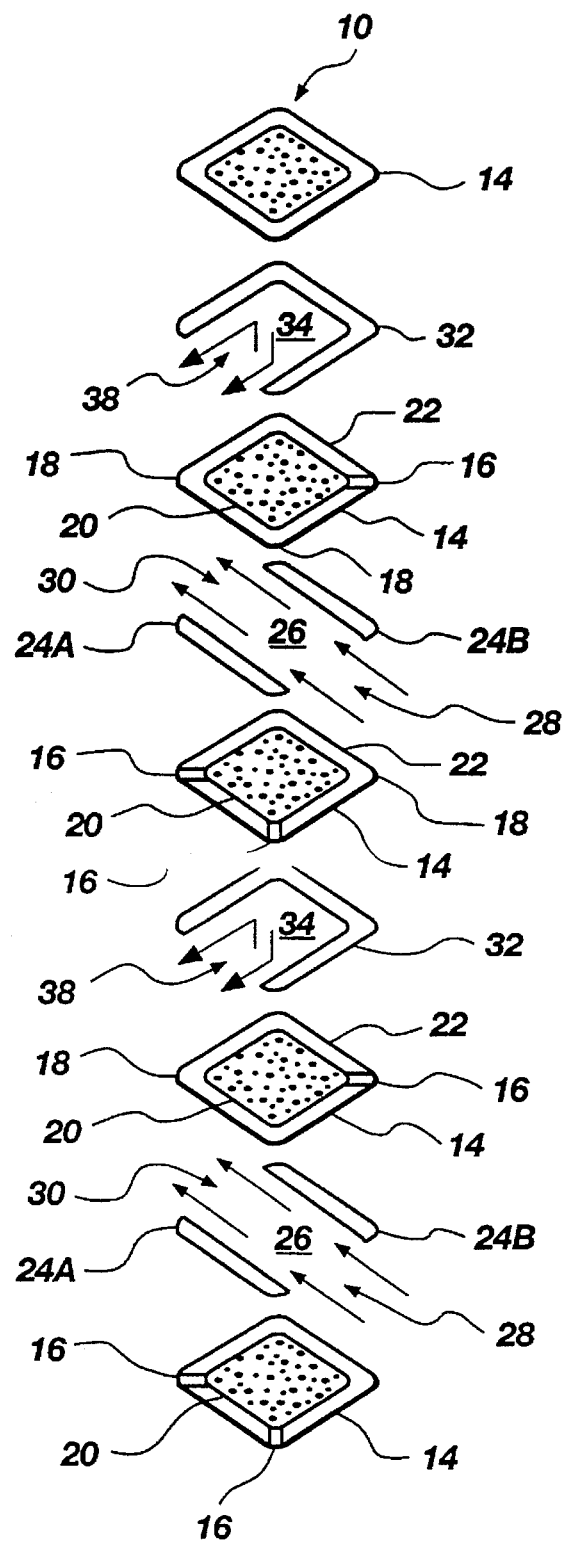
FIG. 1 is an exploded perspective view of an ion conducting device of the instant invention.
Figure 2:
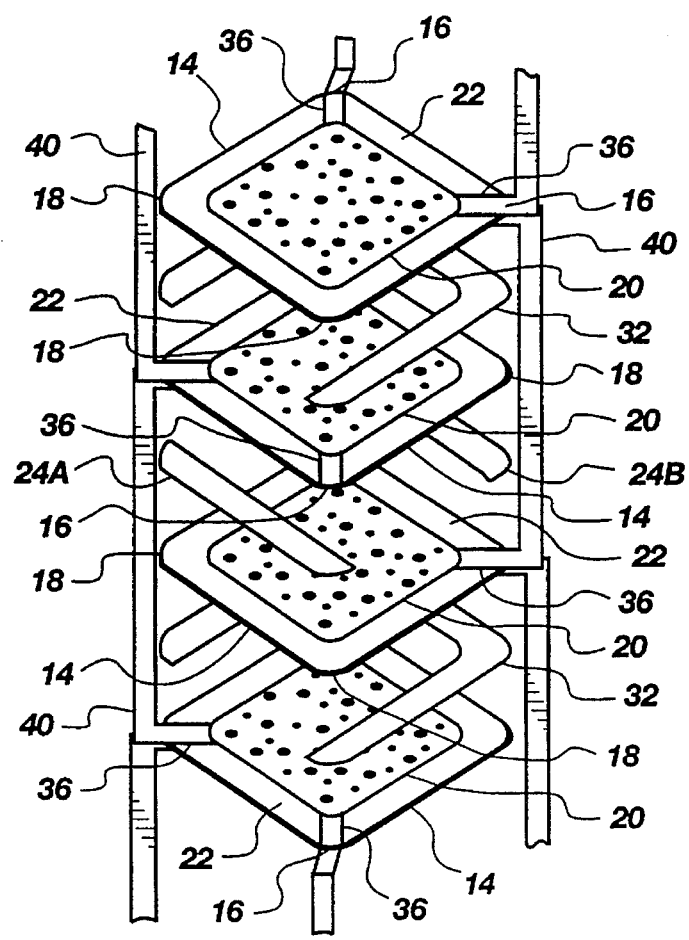
FIG. 2 is an exploded perspective view of an ion conducting device of the instant invention illustrating the specified stacking pattern and the specified pattern of application of electrically conductive material to the chamfered corners of the electrolyte plates.

Referring to FIGS. 1 and 2, an ion conducting device indicated generally as 10 includes a plurality of ion conducting electrolyte plates 14. The number of electrolyte plates employed depends on the desired capacity of the device. The electrolyte plates 14 may be manufactured from any ion conducting material but preferably from a ceramic metal oxide material. In one embodiment, the electrolyte material specifically conducts $O^{-2}$ ions. Materials suitable for $O^{-2}$ ion conduction include the metal oxides of ceria, zirconia, hafnia, and bismuth. Electrolyte materials may be chosen in accordance with their ability to conduct the ions necessary for specific applications. In a preferred arrangement best illustrated by FIG. 2, the electrolyte plates 14 have a pair of square corners 16 and a pair of chamfered corners 18.

Electrode material 20 is attached to at least one flat surface of the electrolyte plates 14, but preferably is attached to both sides of the plates. The electrode material 20 may be any gas permeable material which can be affixed to the electrolyte plates, and which can withstand the high (700°–1000° C.) operating temperature of the device. Electrode materials may be chosen based on their ability to conduct electrons, and their permeability or porosity to rapid flow of gas molecules. Materials particularly suitable for use as electrodes are noble metals such as silver and platinum, and ceramic materials such as lanthium-strontium-manganite. These materials have superior resistance to oxidation, and high conductivity at high temperature. The electrode material 20 may be applied to the electrolyte plate by any suitable method, but in a preferred method is applied by screenprinting. Screenprinting offers several advantages over other techniques. It is reproducible, inexpensive, and easy to perform. The electroded plate may then be thermally treated at a high temperature sufficient to bond the electrode 20 to the electrolyte 14 creating an electrolyte element. The temperature required for bonding varies for different electrode materials, but typically ranges from about 1000° C. to 1400° C. A margin of unelectroded electrolyte surface 22 may be left at the edge of each electrolyte element.

An electrically conductive current collecting material (not shown) may be applied to the electrode surface 20 to distribute an electromotive force over the surface area of the electrode. The current collecting material is preferably a noble metal such as silver, a silver alloy, or platinum, and is applied to the electroded surface in a grid pattern. Since the current collector is less permeable to gas molecules, the grid pattern distributes the electromotive force over the surface of the electrode, yet leaves the majority of electrode surface area available for passage of gas molecules. The grid pattern also produces low sheet resistance to current passing through the current collector. In a preferred application method, the current collector is screenprinted onto the electrode surface. Other methods such as painting may be utilized to apply the current collector to the electrode surface 20.

In a preferred arrangement best illustrated by FIG. 2, electrical interconnect stripes 36 are applied to the electrolyte plates 14 to provide an electrical pathway between the electrode 20 and the square corners 16. The interconnect stripes 36 are an electrically conductive material which spans the unelectroded electrolyte margin 22. The electrical interconnect stripes 36 may be screenprinted onto the electrolyte plates, or applied by an alternative method such as painting.

A sealing material (not shown) such as glass may then be applied to the unelectroded margin 22 and allowed to dry. The sealing material may be applied by screenprinting, or by an alternative method such as painting. The sealing material must not melt or flow at the operating temperature of the stack.

Figure 3:
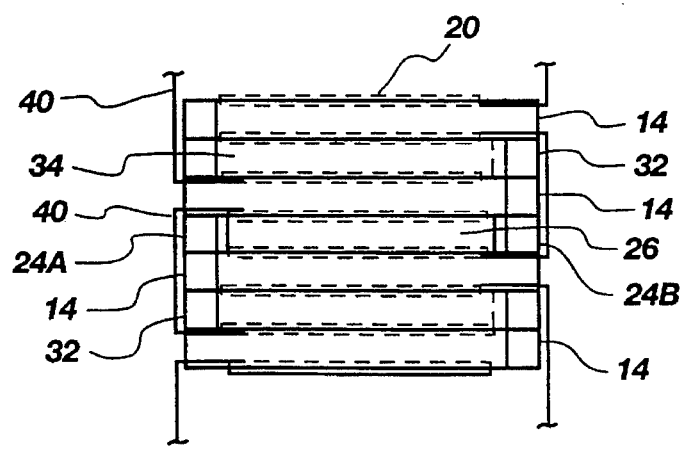
FIG. 3 is a side view of the device illustrating the flow chambers and the specified electrical interconnection scheme.

The electrolyte elements may then be arranged into a stack as illustrated in FIGS. 1, 2, and 3, wherein each element is separated from the element above and below it by spacers. In a preferred arrangement, two types of spacers are alternately disposed between successive electrolyte elements in the stack. A first spacer comprises a pair of spacer bars 24A and 24B. Spacer bars 24A and 24B may be positioned in the unelectroded margin 22, on opposite sides of the electrode material 20. When the spacer bars are sandwiched between a pair of electrolyte elements, a first chamber 26 having an inlet 28 and a first outlet 30, is defined, which is bounded by the spacer bars 24A and 24B, and the electrolyte elements above and below the spacer bars. Reactant gases may flow through first chamber 26, where they come in contact with the electrode surfaces. The flow-through design facilitates a constant flow of fresh reactant gases through first chamber 26.

A second spacer 32 is formed as a U-shaped bar. Second spacer 32 is positioned in the unelectroded-margin 22 on the opposite side of the electrolyte elements from the first spacer. The orientation of second spacer 32 is such that the open end of the U-shape opens 90° from the direction of flow through first chamber 26. When second spacer 32 is sandwiched between a pair of electrolyte elements 14, a second chamber 34, having a second outlet 38, is defined and bounded by second spacer 32 and the electrolyte elements above and below the spacer. Second spacer 32 is oriented in the stack so that the open end of the U-shape opens 90° from both the inlet 28 and first outlet 30 of first chamber 26. The single outlet 38 from second chamber 34 allows for a manifold placed over the outlets to collect product gases from all of the second chambers 34 into one manifold.

In the illustrated embodiment, spacers 24A, 24B and 32 are positioned on the unelectrodedmargin 22 to prevent obstruction of the ion conducting electrode surface, and to facilitate bonding of the spacers to the surface of the electrolyte elements. All corners on the first and second spacers are chamfered in this embodiment. The unelectroded margin 22 is disposed around the edge of the electrolyte plates because inadequate bonding would result if the spacers were placed on the electrode.

The spacers 24A, 24B and 32 are preferably manufactured from the same material as the electrolyte plates. Well known ceramic manufacturing methods, such as dry pressing, may be used to produce the spacers rapidly and inexpensively.

In the embodiment illustrated by FIG. 2, each successive electrolyte element is oriented 180° from the elements above and below it. This means that the square corners 16 face in opposite directions on each successive element. The alternating pattern of assembly is thus as follows: an electrolyte element 14; a U-shaped second spacer 32; another electrolyte element 14 oriented 180° from the previous element; a pair of second spacer bars 24A and 24B oriented 90° from the open end of U-shaped second spacer 32 so that inlet 28 and first outlet 30 from first cheer 26 are oriented 90° from second outlet 38; a third electrolyte element 14 oriented 180° from the previous element; another U-shaped second spacer 32 oriented the same direction as the previous second spacer; another electrolyte element, and so on in this pattern until the desired number of elements has been assembled into the stack.

The stack may then be thermally treated at a temperature sufficiently high to cause the sealing material to soften sufficiently that it bonds the electrolyte elements and spacers into a monolithic stack.

Referring to FIG. 3, the stack of electrolyte elements and spacers may be connected in electrical series to create a current based device. In the illustrated embodiment, when the electrolyte elements 14 and spacers 24A, 24B and 32 are assembled into a stack, the square corners 16 of the plates protrude out past the chamfered corners 18 of the plates above and below them, and the chamfered corners of the spacers. The electrical interconnect stripes 36 are located on the square corners 16 of the electrolyte elements 14, so they too protrude out past the chamfered corners of the spacers and plates. Because successive electrolyte plates are oriented 180° from the plates above and below, the electrical interconnect stripes 36 are exposed. That is, the interconnect stripes 36, are not sandwiched between the spacers, but protrude out past the chamfered corners, and thus are accessible for electrical interconnection. Series electrical connection of similarly oriented plates may be accomplished by applying an electrically conductive material, such as silver paint or paste, to the chamfered corners of the spacers 24A, 24B, and 32, and the chamfered corners of the electrolyte plates 14 above and below each similarly oriented plate. Other electrical interconnection schemes may be envisioned, such as attaching lead wires to notched spacers which are then sealed to the ends of the stack, to electrically connect the electrolyte elements according to the disclosed electrical connection scheme.

This electrode electrical connection scheme is illustrated in FIGS. 2 and 3. An electrically conductive material 40 is in electrical contact with the interconnect stripes 36 on the underside of the top electrolyte plate 14. The pathway of the conductive material 40 thus goes from the interconnect stripe on one side of an electrolyte element, along the chamfered corner of the spacer below the plate, and the chamfered corner of the adverse oriented element, along the chamfered corner of the next spacer, to the top of the next protruding square corner which is an interconnect stripe of the next similarly oriented electrolyte element. The electrical interconnection then continues in this manner from the interconnect stripes on the bottom of this element. The similarly oriented elements are electrically connected in this manner, from one end of the stack to the other. The plates having chamfered corners oriented at this corner of the stack are electrically bypassed because their interconnect stripes are 180° away on the opposite side of the stack.

The electrical pathway wraps around the bottom plate in the stack and proceeds up the opposite side of the stack. The plates having corners on the opposite side of the stack may be electrically connected in the same manner because their interconnect stripes are accessible on this side of the stack. Likewise, the plates previously electrically connected are bypassed because they have chamfered corners on this side of the stack. In following this pathway, the electrical connection pathway runs along the chamfered edge of a spacer, the electrically insulated chamfered corner of an electrolyte element, another spacer's chamfered edge to the next stripe interconnect. This electrical connection scheme means that every other plate is electrically by-passed as the silver metallization runs along the chamfered edges. The result is that a single stack is one series circuit and every whole plate in the stack is an active electrochemical cell.

Several significant advantages are afforded by this electrical interconnection scheme. Every plate in the stack is an active ion conducting element. The electrical interconnect scheme utilizes electrically conductive material applied to the exterior of the plates, so the need for electrically conductive interconnect plates is eliminated. This advantage also obviates the need to incorporate dissimilar materials into the stack having differing coefficients of thermal expansion. The redundant interconnect stripes and external electrical pathway also reduces the occurrence of open electrical circuits and leads to high reliability. If the external electrical pathway ever requires attention, it is assessable and easily serviced.

Another advantage is that each of first chambers 26 is in fluid communication with two electrode surfaces on different plates. Ions are thus conducted from the reactant gases into a pair of plates instead of the usual one. Likewise, ion conduction products such as $O_2$, enter each second chamber 34 between two electrolyte elements. The stack is also better able to withstand stress by eliminating potentially weak points such as grooved interconnectors.

Figure 4:
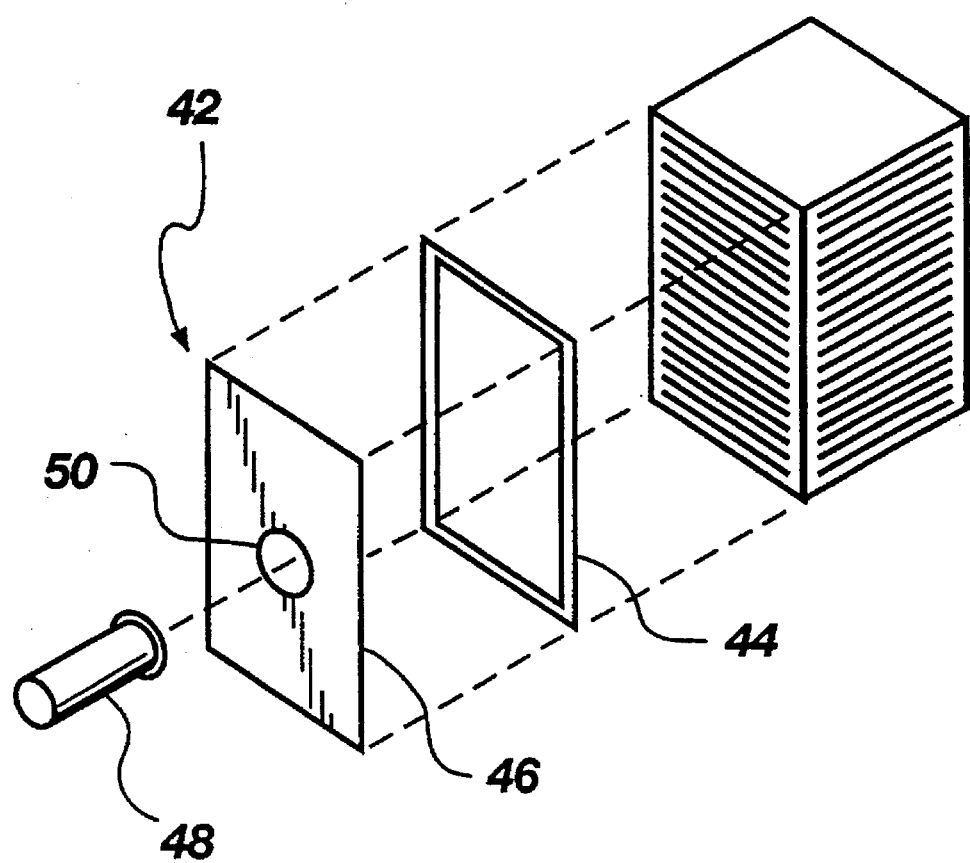
FIG. 4 is a perspective view of an ion conducting device of the instant invention illustrating attachment of a product gas collecting manifold.

Referring to FIG. 4, a manifold, indicated generally as 42, may be sealed to the stack. In the illustrated embodiment, manifold 42 includes a standoff 44 which spaces a manifold cover 46 away from the stack, and provides a seal against the stack. The standoff 44 and the manifold cover 46 may be hermetically sealed using glass frit to ensure a gas-tight seal. An outlet tube 48 may be affixed to an aperture 50 in the manifold cover, to facilitate collection of product gases.

Although the invention has been described with a certain degree of particularity in both composition and structure, it is understood that the present disclosure has been made only by way of example, and numerous changes in details of structure may be resorted to without departing from the scope of the following claims.

What is claimed is:

1. A method of assembling and electrically connecting a plurality of solid oxide electrolyte plates into a monolithic electrochemical ion conducting device comprising the steps:

applying a layer of electrode material to a substantial portion of at least one surface of said electrolyte plates;

heating said electrode layered electrolyte plates to a temperature sufficient to bond said electrode material to said electrolyte plates;

applying an electrical interconnect material to said electrolyte plates to form an electrical pathway between said electrode materials and the exterior of said device;

applying a layer of sealing material to at least a portion of said electrolyte plates;

stacking a plurality of said electrolyte plates in a pattern whereby each plate is separated from successive plates by a solid oxide spacer;

thermally treating a stack of said electrolyte plates and said spacers at a temperature sufficient to activate said sealing material to seal said spacers and said electrolyte plates into a monolithic unit;

electrically connecting in series every other said electrolyte plate in said stack by connecting said electrical interconnects of every other plate from one end of said stack to the other in a first electrical path, extending the electrical pathway around the end of said stack, and connecting said electrical interconnects of every other said plate not connected in a second electrical pathway, said first and second electrical pathways and electrodes connected thereto forming a complete electrical circuit.

2. The method of claim 1 wherein said electrolyte plates are formed from a metal oxide selected from the group consisting of zirconium oxide, cerium oxide, hafnium oxide, or bismuth oxide.

3. The method of claim 1 wherein said electrode material is applied to a central area of said electrolyte plates excluding a peripheral margin of said plate.

4. The method of claim 3 wherein said solid oxide spacers are disposed in said margin of unelectroded electrolyte surface.

5. The method of claim 3 wherein said electrical interconnect includes two stripes of electrically conductive material applied to two portions of said peripheral margin of electrolyte surface and overlapping said electrode area, said stripes forming an electrical pathway between said electrode and the edge of said electrolyte plate.

6. The method of claim 1 wherein a manifold a for collecting products from ion conducting activity is attached to said stack.

* * * * *

UNITED STATES PATENT AND TRADEMARK OFFICE
CERTIFICATE OF CORRECTION

PATENT NO. : 5,479,700
DATED : January 2, 1996
INVENTOR(S) : Nachlas et al.

It is certified that error appears in the above-indentified patent and that said Letters Patent is hereby corrected as shown below:

In col. 6, line 17, change "unelectrodedmargin" to --unelectroded margin--;

In col. 6, line 38, change "cheer" to --chamber--.

Signed and Sealed this

Seventeenth Day of September, 1996

Attest:

BRUCE LEHMAN

Attesting Officer     Commissioner of Patents and Trademarks